(12) United States Patent
Menon et al.

(10) Patent No.: US 10,360,809 B2
(45) Date of Patent: Jul. 23, 2019

(54) COURSE SKELETON FOR ADAPTIVE LEARNING

(71) Applicant: Apollo Education Group, Inc., Phoenix, AZ (US)

(72) Inventors: Satish Menon, Sunnyvale, CA (US); Jayakumar Muthukumarasamy, Dublin, CA (US); Partha Saha, Oakland, CA (US); Kurtis S. Taylor, Mesa, AZ (US); James R. Utter, Lake Stevens, WA (US)

(73) Assignee: APOLLO EDUCATION GROUP, INC., Phoenix, AZ (US)

( * ) Notice: Subject to any disclaimer, the term of this patent is extended or adjusted under 35 U.S.C. 154(b) by 1068 days.

(21) Appl. No.: 13/913,965

(22) Filed: Jun. 10, 2013

(65) Prior Publication Data

US 2013/0280690 A1    Oct. 24, 2013

Related U.S. Application Data

(63) Continuation of application No. 13/271,328, filed on Oct. 12, 2011, now abandoned.

(51) Int. Cl.
*G09B 7/00* (2006.01)
*G06Q 50/20* (2012.01)
*G09B 7/02* (2006.01)

(52) U.S. Cl.
CPC .............. *G09B 7/00* (2013.01); *G06Q 50/20* (2013.01); *G09B 7/02* (2013.01)

(58) Field of Classification Search
USPC ........................ 434/236, 322, 323
See application file for complete search history.

(56) References Cited

U.S. PATENT DOCUMENTS

| | | | |
|---|---|---|---|
| 5,957,699 A | 9/1999 | Peterson et al. | |
| 6,039,575 A | 3/2000 | L'Allier et al. | |

(Continued)

FOREIGN PATENT DOCUMENTS

| | | |
|---|---|---|
| CN | 103975362 A | 8/2014 |
| EP | 2524362 A1 | 11/2012 |

(Continued)

OTHER PUBLICATIONS

Korean Intellectual Property Office, "Office Action" in application No. PCT/US2012/059822 dated Mar. 19, 2013, 10 pages.

(Continued)

*Primary Examiner* — Xuan M Thai
*Assistant Examiner* — Sadaruz Zaman
(74) *Attorney, Agent, or Firm* — Hickman Palermo Becker Bingham LLP

(57) ABSTRACT

A method and apparatus for utilizing a course skeleton for adaptive learning is provided. Based on student profile information and course goal information, a query is generated to dynamically determine which learning items should be presented to the student. The query, which is based on a particular learning goal, may differ from student to student, and therefore different students may be presented with different learning items to achieve the same learning goal. In addition, as new learning items is added to the learning item repository, the learning items returned by the query for a particular learning goal may change, even if the query used for the goal does not.

20 Claims, 3 Drawing Sheets

(56) References Cited

U.S. PATENT DOCUMENTS

| | | | |
|---|---|---|---|
| 6,091,930 A | 7/2000 | Mortimer | |
| 6,118,973 A | 9/2000 | Ho et al. | |
| 6,146,148 A | 11/2000 | Stuppy | |
| 6,149,441 A | 11/2000 | Pellegrino et al. | |
| 6,301,462 B1 | 10/2001 | Freeman et al. | |
| 6,322,366 B1 | 11/2001 | Bergan et al. | |
| 6,334,779 B1 * | 1/2002 | Siefert | 434/322 |
| 6,353,447 B1 | 3/2002 | Truluck et al. | |
| 6,505,031 B1 | 1/2003 | Silder et al. | |
| 6,507,726 B1 * | 1/2003 | Atkinson et al. | 434/350 |
| 6,626,679 B2 | 9/2003 | Skeans et al. | |
| 6,782,396 B2 | 8/2004 | Greene et al. | |
| 6,996,366 B2 | 2/2006 | L'Allier et al. | |
| 7,165,054 B2 | 1/2007 | Geoghegan | |
| 7,590,604 B2 | 9/2009 | Geoghegan | |
| 7,677,896 B1 | 3/2010 | Sonwalkar | |
| 7,930,300 B2 * | 4/2011 | Colbran | 707/726 |
| 2001/0031456 A1 | 10/2001 | Cynaumon et al. | |
| 2001/0049087 A1 | 12/2001 | Hale | |
| 2002/0081561 A1 | 6/2002 | Skeans | |
| 2002/0132217 A1 | 9/2002 | Yonezu | |
| 2002/0142273 A1 | 10/2002 | Whitehurst et al. | |
| 2002/0142278 A1 | 10/2002 | Whitehurst et al. | |
| 2002/0188583 A1 | 12/2002 | Rukavina et al. | |
| 2002/0192629 A1 | 12/2002 | Shafrir | |
| 2003/0003433 A1 | 1/2003 | Carpenter et al. | |
| 2003/0039948 A1 | 2/2003 | Donahue | |
| 2004/0018479 A1 | 1/2004 | Pritchard et al. | |
| 2004/0024569 A1 | 2/2004 | Camilo | |
| 2004/0063085 A1 | 4/2004 | Ivanir | |
| 2004/0161728 A1 | 8/2004 | Benevento | |
| 2004/0202987 A1 | 10/2004 | Scheuring et al. | |
| 2005/0026131 A1 | 2/2005 | Elzinga et al. | |
| 2005/0058978 A1 | 3/2005 | Benevento | |
| 2005/0186550 A1 | 8/2005 | Gillani | |
| 2006/0068367 A1 | 3/2006 | Parke et al. | |
| 2006/0188860 A1 | 8/2006 | Morrison | |
| 2007/0009871 A1 * | 1/2007 | Tidwell-Scheuring et al. | 434/350 |
| 2007/0099161 A1 * | 5/2007 | Krebs et al. | 434/322 |
| 2007/0111188 A1 | 5/2007 | Shell | |
| 2007/0202484 A1 | 8/2007 | Toombs et al. | |
| 2007/0203589 A1 | 8/2007 | Flinn et al. | |
| 2007/0300174 A1 | 12/2007 | Macbeth et al. | |
| 2008/0014569 A1 | 1/2008 | Holiday et al. | |
| 2008/0038705 A1 | 2/2008 | Kerns et al. | |
| 2008/0134045 A1 | 6/2008 | Fridman et al. | |
| 2008/0254434 A1 * | 10/2008 | Calvert | 434/350 |
| 2008/0254438 A1 | 10/2008 | Woolf et al. | |
| 2009/0035733 A1 | 2/2009 | Meitar et al. | |
| 2009/0186329 A1 | 7/2009 | Connor | |
| 2010/0035225 A1 | 2/2010 | Kerfoot | |
| 2010/0041007 A1 * | 2/2010 | Wang | 434/322 |
| 2011/0010328 A1 | 1/2011 | Patel et al. | |
| 2011/0039249 A1 * | 2/2011 | Packard et al. | 434/362 |
| 2011/0177480 A1 * | 7/2011 | Menon et al. | 434/238 |
| 2011/0177483 A1 | 7/2011 | Needham et al. | |
| 2013/0095465 A1 | 4/2013 | Memon et al. | |

FOREIGN PATENT DOCUMENTS

| | | |
|---|---|---|
| EP | 2 766 868 A1 | 8/2014 |
| JP | 200509914 A | 4/2005 |
| KR | 20110090387 A | 8/2011 |
| WO | WO 2009/016612 A2 | 2/2009 |
| WO | WO2011/088412 A1 | 7/2011 |

OTHER PUBLICATIONS

Current Claims in Korean application No. PCT/US2012/059822 dated Mar. 2013, 9 pages.
Canadian Intellectual Property Office, "Office Action", Canadian Application No. 2,787,133, dated Sep. 13, 2013, 2 pages.
Claims from Canadian Application No. 2,787,133, dated Sep. 13, 2013, 19 pages.
The State Intellectual Property Office of the Peoples's Republic of China, "Notification of the 2nd Office Action" in application No. 201180011412.X, dated Jan. 16, 2015, 10 pages.
The State Intellectual Property Office of the People's Republic of China, "Notification of 2nd Office Action" in application No. 201180011412.X, dated Jan. 16, 2015, 7 pages.
Claims in China Application No. 201180011412.X, dated Jan. 2015, 6 pages.
Claim in Chinese Application No. 201180011412.X, dated Jan. 2015, 6 pages.
The State Intellectual Property Office of the People's Republic of China, "Notification of the First Office Action" in application No. 201180011412.X, dated May 30, 2014, 25 pages.
Claims in Chinese Application no. 201180011412.X, dated May 2014, 4 pages.
Mexican Institute of Industrial Property Patent Branch, "Examination Report" in application No. MX/a/2012/00206, dated May 16, 2014, 4 pages.
Claims in Mexican application No. MX/a/2012/008206, dated May 2014, 3 pages.
U.S. Appl. No. 13/409,006, filed Feb. 29, 2012, Office Action, dated Jun. 25, 2014.
European Patent Office, "Search Report" in application No. 12840658.4-1958, dated Mar. 3, 2014, 6 pages.
European Claims in Application No. 12840658.4-1958, dated Mar. 2015, 5 pages.
U.S. Appl. No. 13/409,006, filed Feb. 29, 2012, Office Action, dated Oct. 23, 2014.
U.S. Appl. No. 13/007,147, filed Jan. 14, 2011, Office Action, dated Dec. 9, 2014.
The Patent Office of the People's Republic of China, "Notification of 3rd Office Action" in application No. 201180011412.X, dated May 14, 2015, 5 pages.
Claims in China application No. 201180011412.X, dated May 2015, 9 pages.
European Patent Office, "Summons to Attend Oral Proceedings" in application No. 11702737.5-1958, dated Oct. 29, 2014, 4 pages.
Claims in European Application No. 11702737.5-1958, dated Oct. 2014, 3 pages.
Claims in Canadian Application No. 2,787,133, dated Oct. 2014, 23 pages.
Canadian Intellectual Property Office, "Search Report" in application No. 2,787,133, dated Oct. 21, 2014, 4 pages.
U.S. Appl. No. 13/007,147, filed Jan. 14, 2011, Examiners Answers, dated May 6, 2016.
U.S. Appl. No. 13/409,006, filed Feb. 29, 2012, Office Action, dated Feb. 26, 2016.
U.S. Appl. No. 13/007,147, filed Jan. 14, 2011, Office Action, dated Jul. 25, 2013.
U.S. Appl. No. 13/007,177, filed Jan. 14, 2011, Office Action, dated Aug. 6, 2013.
U.S. Appl. No. 13/409,006, filed Feb. 29, 2012, Final Office Action, dated Aug. 12, 2015.
U.S. Appl. No. 13/007,177, filed Jan. 14, 2011, Final Office Action, dated May 20, 2015.
U.S. Appl. No. 13/007,147, filed Jan. 14, 2011, Final Office Action, dated May 29, 2015.

* cited by examiner

COURSE SKELETON FOR ADAPTIVE LEARNING

BENEFIT CLAIM AND CROSS-REFERENCE TO RELATED APPLICATIONS

This application claims benefit under 35 U.S.C. § 120 as a Continuation of Non-Provisional patent application Ser. No. 13/271,328, filed Oct. 12, 2011, titled "Course Skeleton For Adaptive Learning", and is related to the following applications: (1) patent application Ser. No. 13/007,166, filed on Jan. 14, 2011; (2) patent application Ser. No. 13/007,177, filed on Jan. 14, 2011; (3) patent application Ser. No. 13/007,147, filed on Jan. 14, 2011; and (4) patent application Ser. No. 13/409,006, filed Feb. 29, 2012. The entire contents of all of the above-mentioned applications are hereby incorporated by reference as if fully set forth herein. Applicants hereby rescind any disclaimer of claim scope in the parent and related applications.

FIELD OF THE INVENTION

The present invention relates to learning management systems. In particular, the present invention relates to dynamic course skeletons for adaptive learning.

BACKGROUND

Intelligent learning systems are systems that attempt to assist students in achieving specific learning goals. To date, these systems have mainly used a computerized teaching approach that mirrors the approach taken in brick-and-mortar classrooms. Each student is presented with the same lecture, content, and assessment, regardless of learning style, intelligence, or cognitive characteristics.

Advances in intelligent learning systems have been limited, and are usually applied to logic-based topics such as mathematics, where the content that is served to each student is based on a pre-determined course-specific decision tree that is hard-coded into the system. If a first student and a second student each fail the same assessment by missing the same questions, both students will be presented with the same remedial materials as dictated by the decision tree.

Online courses are examples of "containers" that may employ adaptive learning technology to achieve a specific goal. The container for each course is designed to include all of the information required to achieve success within the course. For example, the content required for achieving the goals of a particular Mathematics course would be directly associated with the container of the Mathematics course. The container for each course also includes the logic that determines which content (in that finite set of content that is directly associated with the container) should be delivered to the student. By performing in a particular way, the student merely traverses down a pre-existing path through the course's logical hierarchy that is hard-coded into the course's container.

Current intelligent learning systems focus on high-level goals, and each student is directed down the same logical path in order to determine which content is provided to the student. For example, an adaptive learning tool may be designed to teach a student a course on the fundamentals of calculus. The designer of the tool will assume that the student possesses the foundational knowledge of mathematics required to begin the course, but since the tool is unaware of any other attribute of the student, the tool may provide a certain amount of "review" information as a means of calibration. All students receive the same information, and performance on assessments will dictate which learning item is presented to the student next.

Current intelligent learning systems "hard-code" these learning items to the logic used to determine the next step for the user. For example, a student that completes "Task A" will always be presented with the video item named "Video_23.mov" to begin the next learning section. Students that do not achieve a predetermined level of success with an assessment or a particular task will always be presented with the multimedia item "Remediation_13.swf" as a means of re-teaching the subject matter required for that particular task.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

It is common for students to take courses that provide too much information that the student already knows. On the other hand, it is also common for a student to complete a course in a sequence, only to be left behind in the next course in the sequence because the next course assumes knowledge that was not sufficiently covered in the earlier course. Students may also be required to take certain courses to complete a degree program, even if only a small portion of the skills learned in those courses pertain to the student's degree program. One way to ensure that students get the most out of their educational experiences is to personalize those educational experiences. By using an adaptive learning engine that employs the techniques described hereafter, students can learn through updated learning items that best fit their individual learning needs.

A "learning item" may be any type of item that can be used to assist in the achievement of a learning goal. For example, a learning item may be content, such as text, video, or an audio podcast. In addition, a learning item may be a learning activity or application, such as a flashcard app, a cognitive tutor app, etc. The techniques described herein are not limited to any particular types of learning items.

In an embodiment, a course "skeleton" is associated with a course of instruction. The course skeleton is made up of a hierarchy of goals, with each goal being associated with goal metadata that describes the goal and provides information about the type of content that may be used to achieve the goal. The course skeleton is used to provide a more dynamic adaptive learning experience. The nodes of the course skeleton are associated with metadata about the corresponding goal. A learning item repository stores learning items and learning item metadata describing the learning items. Instead of directly mapping these learning items to the nodes or goals, the goal metadata is used to dynamically generate a query that can be executed against the learning item repository in order to retrieve learning items for the student.

In an embodiment, learner-specific information is also used to generate the query that determines which content will be presented to the student. For example, student profile information that describes the student's interests, academic history, location information, or type of device the student is using may be used to generate the query.

Structural Overview

Figure 1:
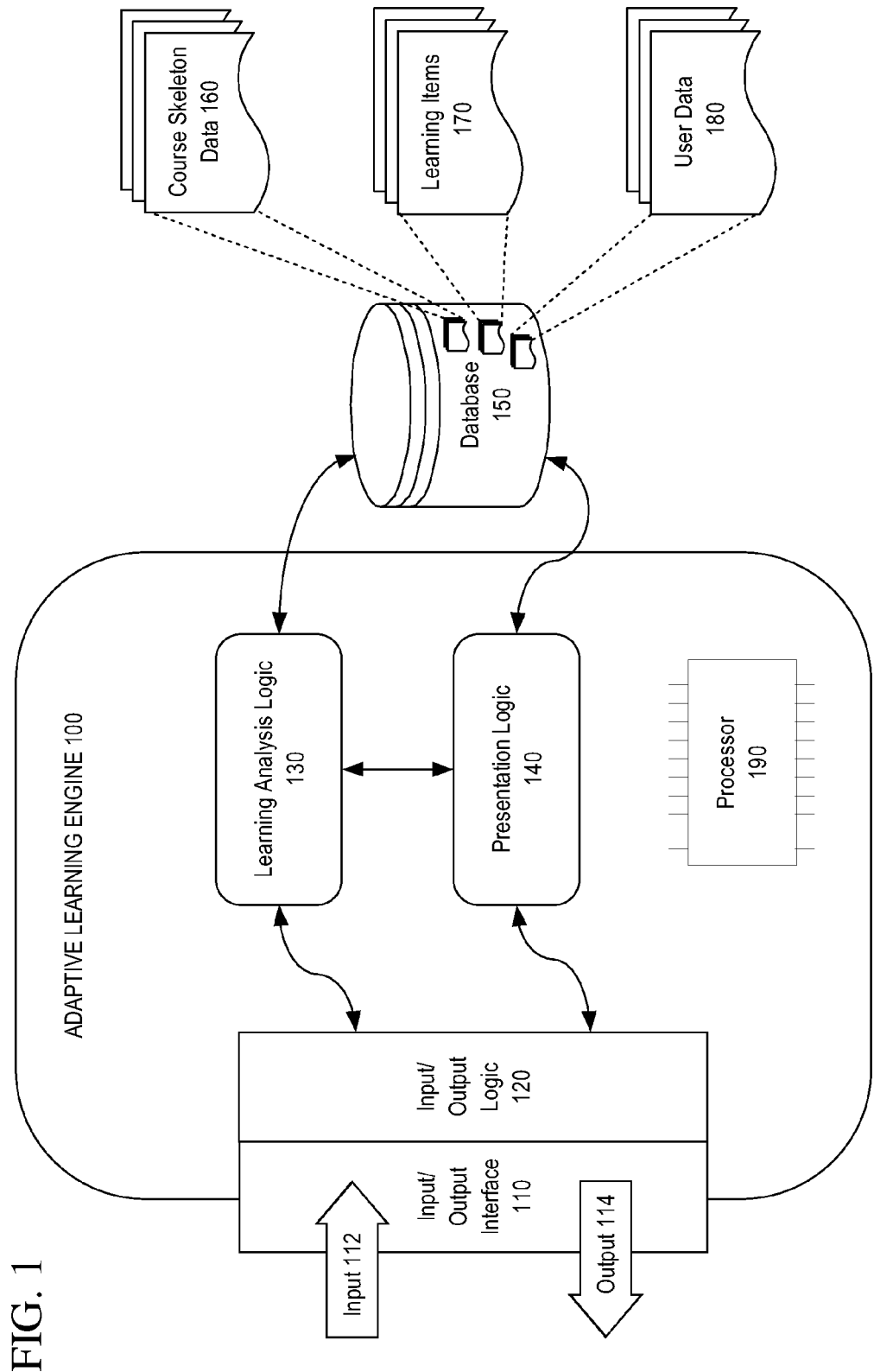
FIG. 1 is a block diagram illustrating a learning management platform on which an embodiment may be implemented.

FIG. 1 is a block diagram illustrating an adaptive learning engine, according to an embodiment of the invention. Adaptive learning engine 100 generally represents a set of one or more computer programs, and associated resources, configured to manage educational data and information about students, provide learning items to students, and use information gathered from analyzing student interaction with the system to increase the effectiveness of future learning items. Adaptive learning engine 100 facilitates the delivery of learning items based on student attributes. Adaptive learning engine 100 includes logic that facilitates communication between its various components.

In the illustrated embodiment, adaptive learning engine 100 includes a processor 190, learning analysis logic 130 and presentation logic 140. Adaptive learning engine 100 may also include or be coupled with other components such as a learning space platform, a learning items manager, a learning tools manager, a data analysis engine, a knowledge base, a personal cognitive DNA manager, and a skills hierarchy manager (not shown). Each of these components shall be described in greater detail hereafter.

Referring to FIG. 1, an input 112 is received by the adaptive learning engine 100 at an input/output (I/O) interface 110. I/O interface 110 may be a network interface such as an Ethernet-based interface. Input 112 may include requests from students such as learning item requests. I/O logic 120 is coupled to I/O interface 110. I/O logic is configured to parse and distribute incoming data and prepare output 114 for sending via I/O interface 110, according to an embodiment. I/O logic 120 may implement one or more communications protocols. I/O logic 120 is coupled to presentation logic 140, in an embodiment. Presentation logic 140 determines the method of delivery of output 114. For example, output 114 may include a multimedia file, or it may include only a link to the multimedia file in an embodiment.

Learning Analysis Logic

Learning analysis logic 130 generally represents a decision-making unit that interacts with all other components of adaptive learning engine 100 and uses information gathered from these components to provide content that is relevant to each individual student based on information gathered from other elements of the adaptive learning engine 100, such as a knowledge base.

Unlike conventional "adaptive learning" systems, learning analysis logic 130 does not merely on traverse a predetermined path that is based only on the student's degree program or class. Rather, learning analysis logic 130 takes into consideration attributes of each student, and dynamically generates queries to be executed against a database or learning item repository. Queries generated for the purpose of learning item retrieval may be based on many factors, which are described hereinafter. The queries may be in any form that takes these attributes into consideration. In one embodiment, learning item retrieval queries are formed using a query language such as Structured Query Language (SQL), and include the desired attributes or arguments as predicates in the query. For example, an example query may be as follows:

SELECT*FROM CONTENT WHERE GOAL='ECO_340_2_5' AND TYPE='FLASH_VIDEO'

While SQL is used in the example above, various other types of query mechanisms may be used. For example, depending on the nature of the repository that is used to store the learning items, learning item retrieval queries may be semantic queries, such as those that use SPARQL (Simple Protocol and RDF Query Language) and RDF for representing the data elements and their relationships.

As students perform activities and take an assessments associated with recommendations, data associated with each student is updated to reflect the types of activities that work well for each student, the strengths and weaknesses of the student, and other useful education-related attributes of the students. As used herein, the term "education-related attributes" refers to any attributes that relate to a student's learning history, goals or abilities. Education-related attributes may include non-transient attributes, such as a student's prior classes and grades, and transient attributes such as a student's current mood. Any education-related data may be used for generating queries for content.

As more data is collected, patterns emerge, and learning analysis logic 130 can generate queries to retrieve individualized learning items with a high degree of confidence in the expected success of each student. For example, it may become clear that a particular student performs poorly when he tries to learn skills using only audio content, even though that student has expressed a preference for audio content. In this case, learning analysis logic 130 may subsequently require content other than audio content to be delivered to the user, instead of or in addition to audio content.

The Learning Items Manager

The learning items manager stores and manages learning items. Learning items includes any items that may be used to achieve a goal. Examples of learning items include text, audio files such as mp3 files, video files such as QuickTime files, interactive flash movies, or any other type of multimedia content.

In an embodiment, learning items manager includes a learning item repository and a content categorization system for storing and organizing learning items. The learning item repository stores content in non-volatile memory, such as a shared hard disk system or a database system such as database 150. Learning items may be stored in a database table, such as the learning items table 170. The learning item categorization system provides content indexing services, along with an interface for creating and associating metadata with learning items stored in the learning item repository.

Learning items may be associated with metadata that describes the learning items. This metadata can be compared against the selection criteria specified in queries generated by learning analysis logic 130 to return learning items that are appropriate for helping students to achieve particular goals. For example, metadata associated with a video may include a title attribute that includes the text "how to factor polynomials." Other attributes may include a general category, such as "math" and a content type, such as "QuickTime video. Metadata may be embedded within the learning items being described by the metadata, may be in a separate Meta file such as an XML file that is associated with the learning items being described, or may be stored in a database with an association to the learning items being described. In an embodiment, learning items are "tagged" with metadata describing the learning items, such as keywords, skills, associated learning objects, the characteristics of learners (e.g. limited prior knowledge) that may benefit from the instructional strategies employed by the learning items (e.g. worked examples), the type of learning items (e.g. video or text), and statistical information regarding the learning item usage. For example, the query SELECT*FROM CONTENT WHERE GOAL='ECO_340_2_5' AND TYPE='FLASH_VIDEO' will look for learning items that are tagged with the goal identifier "ECO_340_2_5" and the type identifier "FLASH_VIDEO." The learning space platform and learning analysis logic 130 may be authorized to add, remove, or alter tags associated with learning items via the learning items manager.

Learning items manager also includes learning item delivery logic configured to manage requests for learning items that are stored in the learning item repository. For example, some learning items may be streamed in order to preserve bandwidth. In some cases, it makes sense to deliver all required learning items for a particular course at the same time, such as when the student expects to be without Internet access for an extended period of time. Thus, learning items manager may be directed by learning analysis logic 130 to deliver learning items in a particular way, depending on attributes of the student. In addition, certain content formats may not be supported by certain devices. For example, learning item delivery logic may choose or even change the format of the learning items being delivered if the device requesting the learning items does not support a particular format, such as the FLASH format.

The Knowledge Base

The knowledge base may be implemented using database 150. The knowledge base manages persistent data and persistently stores snapshots of certain transient data. For example, student categorization information, student study group information, cognitive DNA relationship information, and persistent student profile information may all be stored in the knowledge base. Although this data is persistently stored, the data may change as required by other elements of the adaptive learning engine 100. For example, data analysis engine may provide a report to learning analysis logic 130 that causes learning analysis logic 130 to indicate to the knowledge base, based on the report, that student categorization information for a particular student should be changed. The knowledge base will then alter the persistent data to reflect the indicated change. Various mechanisms may be used to implement the knowledge base. For example, data for the knowledge base may be stored as triples in a triplestore. Instead of or in addition to using a triplestore, a relational database management system may be used to facilitate the storage and retrieval of data. The knowledge base is communicatively coupled to learning analysis logic 130, and provides learning analysis logic 130 with student information to assist in creating an individualized learning recommendation. All data stored in the knowledge base, such as user data 180, can be used to form queries that are used to retrieve individualized learning items for students.

The Personal Cognitive DNA Manager

The personal cognitive DNA manager manages data associated with students, and may be implemented using database 150. A collection of data associated with a student is known as personal cognitive DNA (PDNA), and may be stored in user data 180. The portions of a PDNA that are stored at the personal cognitive DNA manager include transient data, while persistent portions of the PDNA are be stored in the knowledge base in an embodiment. PDNA data stored in the personal cognitive DNA manager may also include references to persistent data stored in the knowledge base. The personal cognitive DNA manager may include a database management system, and may manage PDNA for all students. In an embodiment, instances of the personal cognitive DNA manager may reside on the client computing devices of students, and may be part of a learning space platform. In this embodiment, PDNA for users of the client computing device or the associated learning space platform may be stored in volatile or non-volatile memory. A combination of these embodiments may also be used, where a portion of the personal cognitive DNA manager resides on a client while another portion resides on one or more servers. In an embodiment, the personal cognitive DNA manager is communicatively coupled to learning analysis logic 130, and provides learning analysis logic 130 with transitory student information to assist in creating an individualized query for retrieving relevant learning items from the learning items manager. PDNA and all other user-related information can be used to generate individualized queries for retrieving learning items. For example, a user's location, local time, client device type, or client operating system may be provided to learning analysis logic 130 to assist in determining what type of learning items are appropriate for the environment and device. In an embodiment, the personal cognitive DNA manager and the knowledge base may be combined.

Learning Goal Metadata

Learning goal metadata can be associated with a goal, and is used to describe the corresponding goal and provide information related to the corresponding goal. A goal generally represents an ability, skill, or knowledge that a student is meant to acquire. For example, a skill may represent the ability to perform addition of single-digit numbers, form a complete sentence using a particular language, or type a certain number of words-per-minute. There is no limit to the complexity or simplicity of goals that may be associated with a course skeleton and described in goal metadata. As shall be described in greater detail hereafter, goal metadata may include, by way of example and not by way of limitation, assessments, remediation data, skills hierarchy data, and other data describing the goal.

Content may also be included in goal metadata. In an embodiment, content that is known to teach or facilitate the achievement of a particular goal is included in goal metadata. In contrast to less dynamic adaptive learning systems, the content that is directly associated with the goal is not necessarily delivered to students. Instead, this content may simply be semantically analyzed to determine keywords to use in queries that are executed against a learning items manager or repository. For example, a well-known essay describing a particular type of poem may be associated with the goal of teach about that type of poem. Rather than present the essay to students that need to learn about that type of poem, keywords can be extracted from the essay and used as selection criteria to find other learning items to present to the student to teach about that type of poem. By separating the learning items selection process from the course skeleton, updated learning items can be selected for a user, and course developers are not required to "hard-code" the latest learning items to each individual goal.

Course Skeleton

Figure 2:
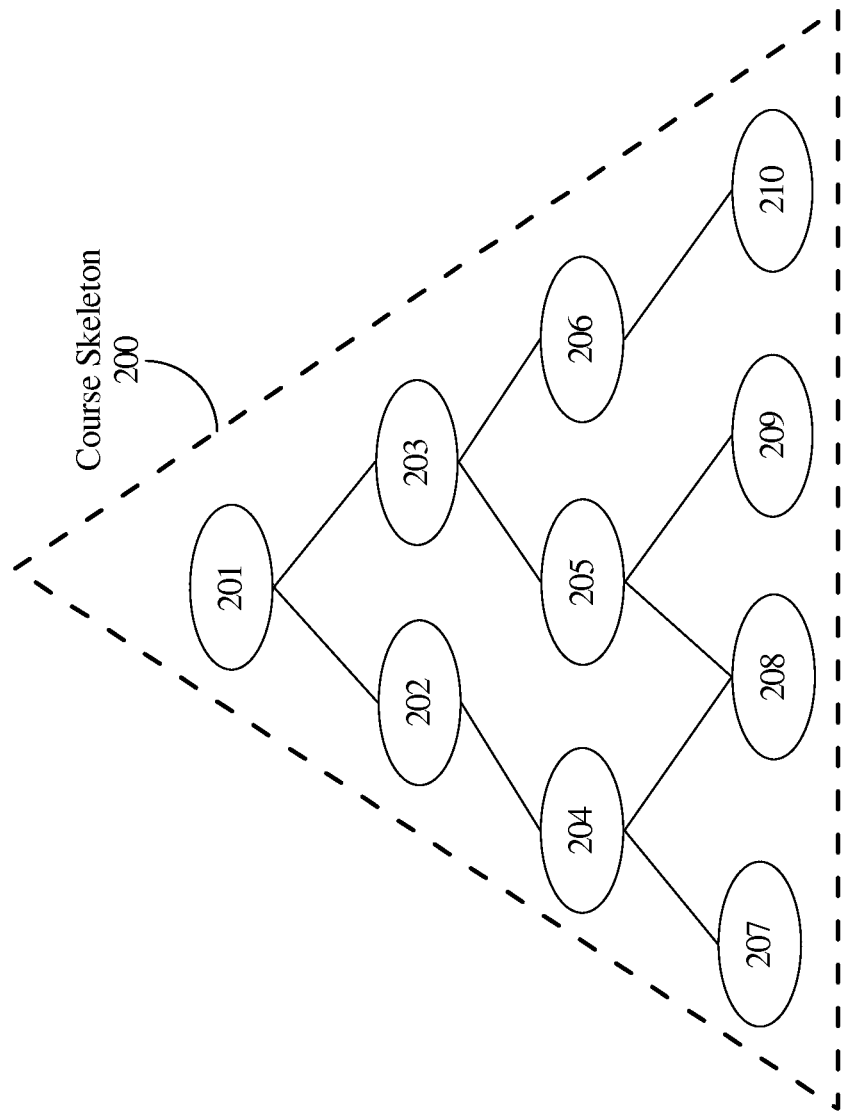
FIG. 2 is a block diagram illustrating a course skeleton structure that may be used in an embodiment.

Recommendations generated by learning analysis logic 130 are based in part on a course skeleton in an embodiment. FIG. 2 is a block diagram illustrating a course skeleton structure 200 that may be used in an embodiment. Course skeleton 200 includes goals 201-210. In an embodiment, data defining a course skeleton is stored in the course skeleton data table 160 in database 150. Course skeleton data may be stored in any format that preserves the hierarchical nature of the course skeleton. For example, a course skeleton may be stored in a relational database system and/or in XML format. For an example course skeleton in XML format, see the code listing submitted concurrently herewith.

A course skeleton can be created in a variety of ways, and the techniques described herein are not limited to any particular way of creating a course skeleton. For example, course skeletons can be created manually, where Subject Matter Experts (SME) and Instructional designers (ID) interact using a collaborative online application. Starting from a set of high level objectives and required material in a course, SMEs and IDs can engage in Socratic dialogue, or use a question template to break down the objectives into finer grained objectives. Alternatively, course skeletons can be created using an automated process where Natural Language Processing (NLP) is used to process the required reading material to discover finer grained objectives. Course skeletons can also be created using a mixed process, where the SME and ID can use some parts of the automated process to validate and quality control their work, or even use it to get suggestions.

A course skeleton may represent a group of goals for a portion of a course, an entire course, a field of study, a certificate program, a degree program, or an individual competency map that represents the skills acquired by a student, or any other education related structure. Course skeletons may include goal metadata that describes a wide variety of goals and various learning theories, content types, and keywords used to find learning items to facilitate the achievement of those goals.

Links between goals in the hierarchy represent the relationship between those goals. For example, a link between two learning goals may mean that the subject matter covered in one of the learning goals requires the achievement of the other goal. A different link may indicate that one learning goal is a prerequisite of the other.

Basic goals need to be attained in order to begin achieving more advanced goals. According to course skeleton 200 for example, the goal associated with node 205 must be acquired before attempting to achieve the goal associated with node 203. In this way, the course skeleton is hierarchical. However, a non-hierarchical approach may be used in an embodiment. For example, a non-hierarchical directed-graph approach may be used in an embodiment that is based on a different learning model.

The Course Skeleton Manager

The course skeleton manager manages goal hierarchy information that describes the relationships between goals. For example, a student may be required to learn how to add and subtract before he learns how to multiply and divide. A complete course skeleton may be made up of interconnected goals that represent all of the goals required to complete a traditional educational course. The nodes in the hierarchy correspond to goals and goal metadata. Since a single node may be considered a prerequisite for many other nodes, and many nodes may be prerequisites for a single node, the hierarchy may be multidimensional.

The course skeleton manager manages the relationships between nodes that represent learning goals. For example, a relational database may be used to keep track of the node dependency information. The course skeleton manager stores goal metadata data that describes skills, remediation information, assessment information, hierarchy association information, and other metadata associated with learning goals. The course skeleton manager interfaces with learning analysis logic 130 and provides learning analysis logic 130 with course skeleton data to assist learning analysis logic 130 in dynamically generating learning item request queries that are specific to each goal.

Learning Theories, Models, and Strategies

Learning theories address how people learn by providing a paradigm through which to view a learning objective. Although theories are abundant, three well-understood theories are behaviorism, constructivism, and cognitivism. Behaviorism is a view that is based on the assumption that people learn based on stimulation. Positive or negative reinforcement shapes the behavior of the student. Constructivism is a view that assumes that the student learns as an experience, and that the learner actually constructs their own representations of reality. Cognitivism is a view that assumes that people learn as they mentally process information in a manner that coincides with their cognitive architecture, and do not merely react to stimulation.

Learning models are created based on learning theories, and are meant to operationalize one or more learning theories. Different instructional strategies may be used, depending on the model to be implemented. Instructional strategies might vary content sequencing, instructional technique (direct, indirect), type of content presentation (lecture, case study, group discussion, etc.), level of collaboration (individual, pairs, small group), amount of practice, type of feedback (peer, instructor) and so forth. Learning items and tools that facilitate the delivery of learning items can be used to implement instructional strategies. Examples of learning items include text, video, audio, and games. Examples of tools include video players, browser plug-ins, e-book readers, shared whiteboard systems, and chat systems. Many other examples of learning items and tools exist.

The theories and models together have been created to classify, adapt and guide the process of educating a student, taking into consideration the characteristics of the student that are pertinent for learning. To date, learning models have been implemented in application "silos" where each application implemented a specific model (e.g. intelligent tutors), catering to very specific topics that suited the model's flat hierarchy based algorithms, typically for logical subjects such as mathematics. These types of applications have limited use in broad-based education, such as a 4-year degree program or inter-disciplinary subjects such as Economics, and Marketing.

Personal Cognitive DNA

In an embodiment, learning models and theories may be operationalized using each student's PDNA to generate learning item request queries for students, which are executed against a learning items manager or repository. As the information associated with a particular student changes, the queries generated on behalf of that student will change to reflect the latest understanding of that student's learning requirements, preferences, and goals.

Although PDNA is referred to herein as "personal cognitive DNA," this label does not indicate that PDNA data collection and usage is limited to embodiments that are based upon cognitive models. PDNA data includes information about a student's cognitive strengths and weaknesses (as well as preferences) that are provided explicitly by the student or inferred by the system as the student interacts with the system and the outcomes are measured.

PDNA may be used in any embodiment, independent of any particular learning model. PDNA data is a collection of data associated with a student. Transient profile data may be stored in the personal cognitive DNA manager, while persistent profile data may be stored in the knowledge base. PDNA data stored in the personal cognitive DNA manager may include references to persistent data directly or indirectly associated with the student that is stored in the knowledge base.

In order to provide the right experiences to the student, in addition to the proper tools and models, the system collects and maintains a dynamically updating rich data layer to support predictive education models in an embodiment. A rich data layer generally refers to information that is gathered and linked to create intelligence that may be used to inform learning analysis logic 130, which uses this information to generate learning item request queries. In one embodiment, the rich data layer is dynamically updating in that the data being collected changes over time, and data that does not conform to the changes becomes incorrect. For example, as a student achieves a high degree of proficiency with a particular skill, data that suggests that the student needs to become proficient with the skill becomes outdated and incorrect. Thus, the dynamic data layer must keep up with the current information available for each student.

Each student using adaptive learning engine 100 is associated with PDNA for that student. When a student is new to the system, the PDNA for that student may contain minimal information, such as demographic information, a student's declared major, self-proclaimed learning preferences, and imported transcript data such as grades and coursework done at other institutions. However, as the student begins using the adaptive learning engine 100, vast amounts of data may be collected and analyzed by the data analysis engine, resulting in new PDNA information that describes how the student learns, what level the student has achieved in a particular course, whether the student understands a particular concept or possesses a particular skill, the pace at which the student learns, or even the time of day the student is most likely to correctly answer a question.

Many of these student attributes change over time, but may still be considered persistent based on the frequency of change. For example, a student may initially have low reading comprehension ability and learn material more efficiently when listening to an audio recording, but may later learn more efficiently by reading text-based material. Other student attributes may be more transient in nature. For example, the PDNA may include data that identifies the student's current location, what client computing device they are using (e.g. iPhone, laptop, or netbook), what operating system they are using, whether or not their web browser supports the Flash plug-in, or whether the student sets his status as "tired."

It may be the case that a particular student performs differently depending on environmental factors, while another student may be capable of learning regardless of the environment. For example, one student may be able to study on a commuter train while another may not. One student may be capable of learning via an audio program while another requires text information or video. In addition, certain tasks may be reserved for particular times or places in order to calibrate the system. For example, the system may be configured to only offer assessments when a student's transient PDNA data shows that the time in the student's current time zone is between certain daylight hours.

Metrics may be assigned to particular attributes in each student's PDNA. For example, metrics may describe expected or historical success with different learning characteristics. These metrics may help learning analysis logic 130 determine whether the student is successful when participating in collaborative learning exercises, or whether the student would benefit more from self-study. A student may have a metric of "7" for the attribute "performs well with individual work" and a metric of "2" for the "performs well with collaborative work" attribute. Higher scores are not necessarily the only factor used in determining the learning strategy for the student, however. For example, the learning track that the student is on may actually require that the student develop collaboration skills Therefore, the learning analysis logic 130 may generate queries that request learning items for the student that will bolster his ability to learn collaboratively. In other words, the system will provide learning items that teach the student the underlying skills required to allow the student to become successful at collaborative work. PDNA for a particular student may be analyzed and compared to PDNA of other students in order to generate more accurate learning item request queries. This feature is especially useful when limited information is available about a student, but enough is known about the student to associate the student with a particular group of students for which more information is available. For example, learning analysis logic 130 may analyze the PDNA information for all students in the system, over time, to predict various things, including: what method of learning is best for each student, which track will yield the highest chance of success for a given student in a particular program, which programs the student would be successful in, which courses the student may be expected to struggle with, and even which career would best suit the student.

DNA Fingerprints

An analysis of hundreds, thousands, or even larger numbers PDNA data sets yields statistically valid cognitive DNA "fingerprints" that may be used for generating learning item request queries in an embodiment. A DNA fingerprint is based on aggregate PDNA data. Generally, a DNA fingerprint is made by selecting a set of PDNA data having one or more PDNA attributes in common and generating a single profile that is representative of the entire set.

For example, a DNA fingerprint may be generated for students that have recently completed a learning object that teaches the calculus skill of taking the derivative of a second degree polynomial. The recency of the completion of the learning object is determined based on the time that the data was stored, so snapshots that were taken at checkpoints occurring immediately after students completed the learning object will qualify for inclusion in the set of PDNA data considered for use in the creation of the DNA fingerprint.

Each attribute in the PDNA data considered in the creation of the DNA fingerprint may be aggregated, averaged, or otherwise considered, resulting in a fingerprint of that attribute. For example, if the average value of the attribute "abstract learning ability" is "80" in the PDNA data in the set, then the DNA fingerprint may inherit this value for the same attribute. Any method of considering or combining PDNA data to generate DNA fingerprint data may be used. For example, the lowest value, the median value, or a sum of the values may be used as the fingerprint value for a particular attribute. Some attributes, especially those with very little correlation to the common PDNA attribute, may not be assigned a DNA fingerprint value, or may be assigned a NULL value, indicating that conclusions about that attribute are statistically invalid for that set of PDNA. Once each attribute has been considered for the set, then the resulting values for each attribute are stored in one or more records as a DNA fingerprint for that set of PDNA data.

Assessments

In one embodiment, assessments designed to determine whether a student has achieved a goal are associated with the corresponding learning metadata for that goal. A student uses assessments to demonstrate the skills and knowledge associated with the learning goal. More than one assessment may be included in the learning metadata for a particular goal. Learners may be required to successfully complete all, or a subset, of the assessments in order to receive an advancement recommendation from learning analysis logic 130. An advancement recommendation is essentially a determination that a student is ready to move on to a different goal because a perquisite goal has been achieved by the student.

Performance on specific assessments may be analyzed to determine the level, amount or type of learning items a student needs next. For example, a student that performs poorly on an assessment may require remedial learning items that cover a general overview of the subject. Learning analysis logic 130 may form a learning item request query, based on this determination, which includes the predicate: LEVEL="GENERAL". The execution of this query against the learning item management system will result in the delivery of learning items that have been tagged as the "general" level.

Selecting Learning Items Using Dynamically Generated Queries

In an embodiment, the learning item repository includes learning items, such as multimedia, audio, text, and video files. In addition, the learning item repository includes learning item metadata that describes the learning items. For example, the learning item metadata may be stored in a database with a relational link to the learning items described by the metadata. A logical hierarchy such as course skeleton 200 is stored in the course skeleton data table 160 in database 150. The course skeleton is representative of a course of instruction, and each node in the hierarchy represents a learning goal. Corresponding goal metadata that describes each learning goal is associated with each node in the course skeleton. A first user that is working on a goal associated with a particular node in the course skeleton makes a request for learning items to adaptive learning engine 100. Learning analysis logic 130 generates a query to be executed against the learning item repository using goal metadata associated with the learning goal that the student is attempting to achieve. A learning item or a reference to a learning item from learning items table 170 is returned, and presentation logic 140 presents the learning item to the student.

A second user requests learning items from adaptive learning engine in an embodiment. The second user is attempting to achieve the same goal as the first user, and therefore an identical query is generated for the second user. However, when the query is executed for the second user, a learning item is returned that is different than the learning item that was returned for the first user. In an embodiment, additional learning items is added to the learning item repository between the execution of the query for the first user and the execution of the query for the second user. This additional learning items is determined to be more relevant to the query, and therefore the updated learning items is delivered to the second user.

In an embodiment, profiles such as PDNA profiles are maintained for users. Queries are generated using arguments (such as predicates) that are based on education-related attributes that are associated with the users. For example, a query is generated to request video learning items that last no longer than 20 minutes for a user that has a low attention span attribute stored in his PDNA profile. In an embodiment, learning analysis logic determines that a first student has a profile that is similar to the profile of a second student, and therefore generates the same query for both students. However, other factors may cause the students to receive different learning items, as discussed above.

In an embodiment, goal metadata is semantically analyzed to determine keywords that should be used in a query to request learning items. In another embodiment, a semantic analysis may be performed on user generated data such as forum postings in order to determine topics of interest to the user. One or more keywords associated with the topics of interest are then used to generate a learning item request query.

In an embodiment, one or more arguments used in a query are identified by the learning items manager as failing to match learning items in the learning item repository. Learning items manager generates a report that identifies the failing arguments. These arguments correspond to attributes that would possibly further enrich the learning experience of one or more users. Therefore, learning items having these attributes may be desirable. The report ranks these attributes from the most to least desirable in an embodiment. For example, the attributes requested most frequently or most recently may be listed at the top of the report, while unpopular attributes are listed at the bottom.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
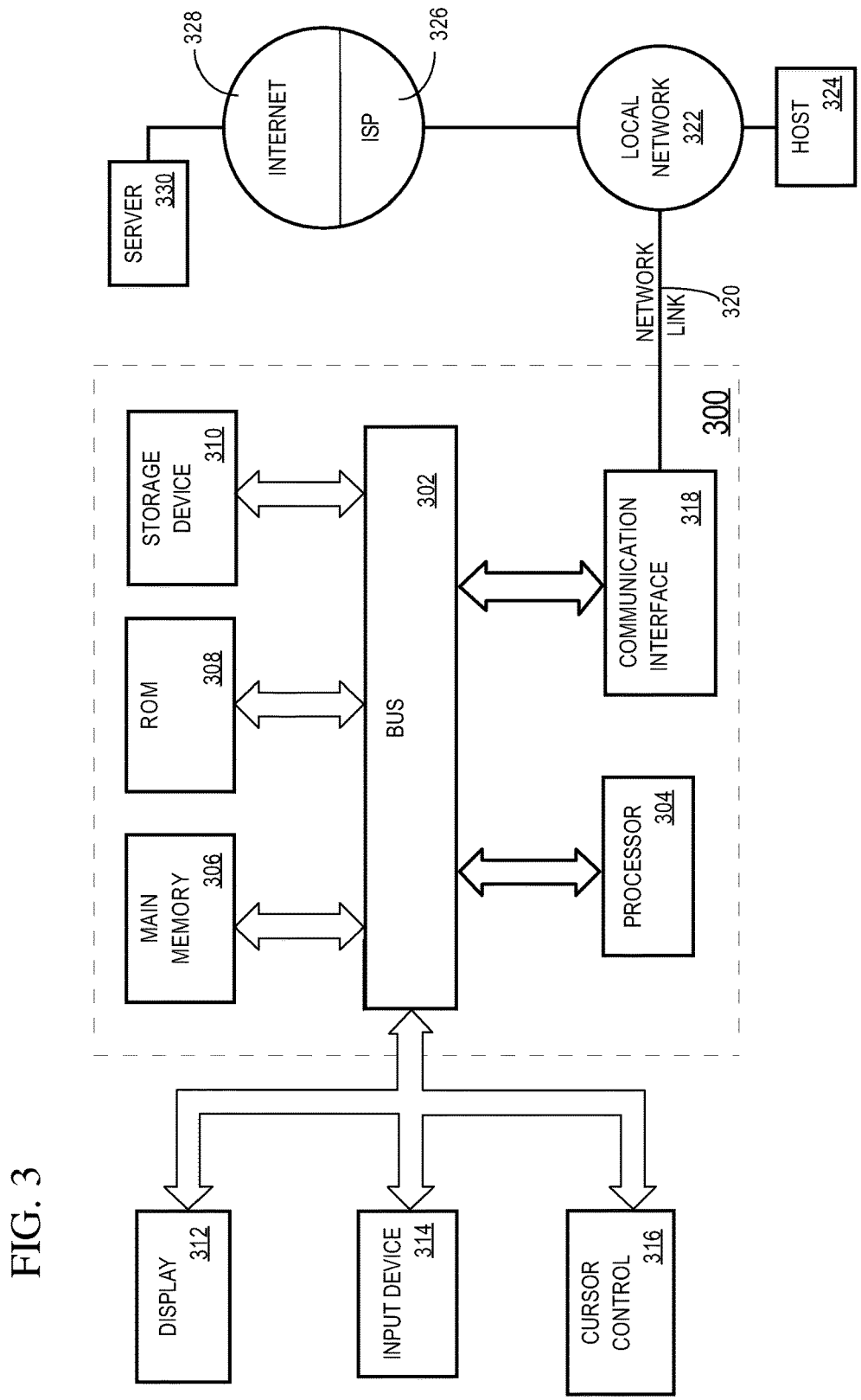
FIG. 3 illustrates a computer system upon which an embodiment may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   maintaining a hierarchy of learning goals that includes a plurality of learning goal nodes, each node corresponding to a learning goal;
   adding, to the hierarchy of learning goals, a first learning goal node corresponding to a particular learning goal;
   wherein the first learning goal node is associated with a particular set of learning goal metadata;
   wherein the particular set of learning goal metadata includes a particular set of metadata items for finding learning items;
   wherein the particular set of metadata items does not identify any particular learning items;
   maintaining a learning item repository, wherein the learning item repository includes a plurality of learning items;
   receiving a request for learning items for a particular user;
   automatically determining that the request is for learning items to assist the particular user to achieve the particular learning goal;
   in response to determining that the request is for learning items to assist the particular user to achieve the particular learning goal:
      automatically identifying the first learning goal node in the hierarchy of learning goals,
      automatically identifying the particular set of metadata items included in the particular set of learning goal metadata associated with the first learning goal node, and
      automatically using the particular set of metadata items to identify a particular learning item, from the learning item repository, to facilitate achievement of the particular learning goal; and
   automatically providing the particular learning item as a response to the request for learning items;
   wherein the steps of maintaining the hierarchy of learning goals, maintaining the learning item repository, receiving the request, using the particular set of metadata items, and providing the particular learning item are performed by one or more computing devices.

2. The method of claim 1, wherein:
   the particular set of metadata items include a metadata item that identifies a learning theory; and
   automatically using the particular set of metadata items to identify a particular learning item includes finding a particular learning item based, at least in part, on the learning theory.

3. The method of claim 1, wherein:
   the particular set of metadata items include a metadata item that identifies a content type; and
   automatically using the particular set of metadata items to identify a particular learning item includes finding a particular learning item that is associated with the content type.

4. The method of claim 1, wherein:
   the particular set of metadata items include a metadata item that identifies a keyword; and
   automatically using the particular set of metadata items to identify a particular learning item includes finding a particular learning item that is associated with the keyword.

5. The method of claim 1, wherein:
   the particular set of metadata items includes particular content; and
   automatically using the particular set of metadata items to identify a particular learning item includes:
      performing a semantic analysis of the particular content to determine keywords, and
      finding a particular learning item that is associated with one or more of the keywords.

6. The method of claim 1, wherein:
   the hierarchy of learning goals represents all of the learning goals required to complete an educational course; and
   the method further comprises linking the first learning goal node to a second learning goal node in the hierarchy of learning goals;
   wherein the link between the first learning goal node and the second learning goal node indicates that completing the second learning goal node is a prerequisite to the first learning goal node.

7. The method of claim 6, wherein a second link between the second learning goal node and a third learning goal node of the hierarchy of learning goals indicates that completing the second learning goal node is a prerequisite to the third learning goal node.

8. The method of claim 6, wherein a second link between the first learning goal node and a third learning goal node of the hierarchy of learning goals indicates that completing the third learning goal node is a prerequisite to the first learning goal node.

9. The method of claim 1, wherein:
   the particular set of metadata items include an assessment metadata item that identifies an assessment that is configured to demonstrate a user's knowledge associated with the particular learning goal; and
   the method further comprises:
      prior to receiving the request for learning items:
         receiving results of the assessment that is identified in the assessment metadata item,
         analyzing the results of the assessment to determine a level of learning item; and
      wherein automatically using the particular set of metadata items to identify the particular learning item further comprises using the determined level of learning item to identify the particular learning item; and
      wherein the particular learning item is associated with the determined level of learning item.

10. The method of claim 1, wherein automatically using the particular set of metadata items to identify a particular learning item further comprises:
   generating a query that includes arguments that are based at least in part on one or more of the particular set of metadata items; and
   causing the query to be executed against the learning item repository.

11. One or more non-transitory computer readable media storing instructions which, when executed by one or more processors, cause performance of the steps of:
   maintaining a hierarchy of learning goals that includes a plurality of learning goal nodes, each node corresponding to a learning goal;
   adding, to the hierarchy of learning goals, a first learning goal node corresponding to a particular learning goal;
   wherein the first learning goal node is associated with a particular set of learning goal metadata;
   wherein the particular set of learning goal metadata includes a particular set of metadata items for finding learning items;
   wherein the particular set of metadata items does not identify any particular learning items;
   maintaining a learning item repository, wherein the learning item repository includes a plurality of learning items;
   receiving a request for learning items for a particular user;
   automatically determining that the request is for learning items to assist the particular user to achieve the particular learning goal;
   in response to determining that the request is for learning items to assist the particular user to achieve the particular learning goal:
      automatically identifying the first learning goal node in the hierarchy of learning goals,
      automatically identifying the particular set of metadata items included in the particular set of learning goal metadata associated with the first learning goal node, and
      automatically using the particular set of metadata items to identify a particular learning item, from the learning item repository, to facilitate achievement of the particular learning goal; and
   automatically providing the particular learning item as a response to the request for learning items.

12. The one or more non-transitory computer readable media of claim 11, wherein:
   the particular set of metadata items include a metadata item that identifies a learning theory; and
   automatically using the particular set of metadata to identify a particular learning item includes finding a particular learning item based, at least in part, on the learning theory.

13. The one or more non-transitory computer readable media of claim 11, wherein:
   the particular set of metadata items include a metadata item that identifies a content type; and
   automatically using the particular set of metadata items to identify a particular learning item includes finding a particular learning item that is associated with the content type.

14. The one or more non-transitory computer readable media of claim 11, wherein:
   the particular set of metadata items include a metadata item that identifies a keyword; and
   automatically using the particular set of metadata items to identify a particular learning item includes finding a particular learning item that is associated with the keyword.

15. The one or more non-transitory computer readable media of claim 11, wherein:
   the particular set of metadata items includes particular content; and
   automatically using the particular set of metadata items to identify a particular learning item includes:
      performing a semantic analysis of the particular content to determine keywords, and
      finding a particular learning item that is associated with one or more of the keywords.

16. The one or more non-transitory computer readable media of claim 11, wherein:
   the hierarchy of learning goals represents all of the learning goals required to complete an educational course; and
   the instructions further comprise instructions for linking the first learning goal node to a second learning goal node in the hierarchy of learning goals;
   wherein the link between the first learning goal node and the second learning goal node indicates that completing the second learning goal node is a prerequisite to the first learning goal node.

17. The one or more non-transitory computer readable media of claim 16, wherein a second link between the second learning goal node and a third learning goal node of the hierarchy of learning goals indicates that completing the second learning goal node is a prerequisite to the third learning goal node.

18. The one or more non-transitory computer readable media of claim 16, wherein a second link between the first learning goal node and a third learning goal node of the hierarchy of learning goals indicates that completing the third learning goal node is a prerequisite to the first learning goal node.

19. The one or more non-transitory computer readable media of claim 16, wherein:
   the particular set of metadata items include an assessment metadata item that identifies an assessment that is configured to demonstrate a user's knowledge associated with the particular learning goal; and
   the instructions further comprise instructions for:
      prior to receiving the request for learning items:
         receiving results of the assessment that is identified in the assessment metadata item,
         analyzing the results of the assessment to determine a level of learning item; and
      wherein automatically using the particular set of metadata items to identify the particular learning item further comprises using the determined level of learning item to identify the particular learning item; and
      wherein the particular learning item is associated with the determined level of learning item.

20. The one or more non-transitory computer readable media of claim 11, wherein automatically using the particular set of metadata items to identify a particular learning item further comprises:
   generating a query that includes arguments that are based at least in part on one or more of the particular set of metadata items; and causing the query to be executed against the learning item repository.

* * * * *